(12) United States Patent
Zhang (10) Patent No.: US 11,979,909 B2
(45) Date of Patent: May 7, 2024

(54) METHOD AND DEVICE USED FOR RELAY WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 88 days.

(21) Appl. No.: 17/542,514

(22) Filed: Dec. 6, 2021

(65) Prior Publication Data

US 2022/0183065 A1 Jun. 9, 2022

(30) Foreign Application Priority Data

Dec. 7, 2020 (CN) .......................... 202011417985.X (51) Int. Cl.
*H04W 74/0816* (2024.01)
*H04W 56/00* (2009.01)
*H04W 74/08* (2009.01)
*H04W 92/18* (2009.01)

(52) U.S. Cl.
CPC ..... *H04W 74/0816* (2013.01); *H04W 56/001* (2013.01); *H04W 74/0866* (2013.01); *H04W 92/18* (2013.01)

(58) Field of Classification Search
CPC ........... H04W 74/0816; H04W 56/001; H04W 74/0866; H04W 92/18; H04W 72/20; H04W 84/04; H04W 74/0833
See application file for complete search history.

(56) References Cited

U.S. PATENT DOCUMENTS

| | | | | |
|---|---|---|---|---|
| 2009/0196175 | A1* | 8/2009 | Sammour ............. | H04W 36/02 370/230.1 |
| 2013/0022016 | A1* | 1/2013 | Wei ....................... | H04L 5/0098 370/329 |
| 2013/0114583 | A1* | 5/2013 | Park ................... | H04W 52/0216 370/338 |
| 2014/0087748 | A1* | 3/2014 | Hong .................... | H04W 72/21 455/452.1 |
| 2015/0282148 | A1* | 10/2015 | Le ......................... | H04W 72/20 370/329 |

(Continued)

OTHER PUBLICATIONS

Agiwal et al. U.S. Appl. No. 62/948,362, filed Dec. 16, 2019 (Year: 2019).*

*Primary Examiner* — Wutchung Chu (57) ABSTRACT

The present disclosure provides a method and device used for relay wireless communications. A first node transmits a first radio signal, the first radio signal comprises a first message; transmits a third radio signal on a first radio resource; and receives a second radio signal, the second radio signal comprises a second message, the second message is used to indicate the first radio resource; wherein the first message is used to trigger the second message, and the first radio resource is used for a non-competitive random access. In the L2 relay communication architecture of the present disclosure, the first node acquires a UL synchronization through a non-competitive random access procedure, which can effectively support transmitting end-to-end control information of the PHY layer or the higher layer via a Uu interface.

15 Claims, 5 Drawing Sheets

(56) References Cited

U.S. PATENT DOCUMENTS

| | | | | |
|---|---|---|---|---|
| 2017/0164238 | A1* | 6/2017 | Paredes Cabrera | H04W 28/22 |
| 2019/0166619 | A1* | 5/2019 | Takeda | H04W 72/12 |
| 2019/0215706 | A1* | 7/2019 | Tsai | H04W 24/04 |
| 2019/0274169 | A1* | 9/2019 | Tsai | H04W 56/0045 |
| 2019/0313447 | A1* | 10/2019 | Islam | H04W 74/006 |
| 2020/0137798 | A1* | 4/2020 | Bergquist | H04W 52/50 |
| 2020/0163124 | A1* | 5/2020 | Da | H04W 74/0833 |
| 2020/0229235 | A1* | 7/2020 | Lu | H04W 74/08 |
| 2020/0267721 | A1* | 8/2020 | Venkatram | H04W 74/0833 |
| 2020/0305200 | A1* | 9/2020 | Jiang | H04W 72/21 |
| 2020/0322943 | A1* | 10/2020 | Shi | H04L 69/22 |
| 2020/0404712 | A1* | 12/2020 | Christoffersson | H04W 28/26 |
| 2021/0100034 | A1* | 4/2021 | Turtinen | H04B 17/318 |
| 2021/0144777 | A1* | 5/2021 | Tang | H04W 74/008 |
| 2021/0185733 | A1* | 6/2021 | Agiwal | H04W 76/11 |
| 2021/0212115 | A1* | 7/2021 | Dong | H04W 72/044 |
| 2021/0227587 | A1* | 7/2021 | Tsai | H04W 56/0045 |
| 2021/0243812 | A1* | 8/2021 | Agiwal | H04W 74/008 |
| 2021/0250989 | A1* | 8/2021 | Chin | H04W 76/27 |
| 2021/0251013 | A1* | 8/2021 | Turtinen | H04W 74/0833 |
| 2022/0015134 | A1* | 1/2022 | Liang | H04W 72/23 |
| 2022/0248458 | A1* | 8/2022 | Chen | H04W 74/006 |
| 2022/0400513 | A1* | 12/2022 | Li | H04W 74/006 |
| 2022/0407546 | A1* | 12/2022 | Nishio | H04W 16/28 |
| 2023/0104628 | A1* | 4/2023 | Tao | H04W 8/02 370/329 |
| 2023/0120792 | A1* | 4/2023 | Li | H04W 74/0833 |
| 2023/0127054 | A1* | 4/2023 | Lee | H04W 76/27 370/329 |

\* cited by examiner

METHOD AND DEVICE USED FOR RELAY WIRELESS COMMUNICATION

CROSS REFERENCE TO RELATED APPLICATIONS

This application claims the priority benefit of Chinese Patent Application No. 202011417985.X, filed on Dec. 7, 2020, the full disclosure of which is incorporated herein by reference.

BACKGROUND

Technical Field

The present disclosure relates to methods and devices in wireless communication systems, and in particular to a method and device for acquiring uplink synchronization in relay wireless communications.

Related Art

As a multi-hop transmission technology, relay can increase throughput and expand coverage. Relay communication is a common method in cellular network communications. Data from a source node is forwarded by a relay node (RN) to a remote node. The source node and the remote node are usually a base station and a User Equipment (UE), or both UEs; the relay node may be a network device or a UE. Taking Sidelink (SL) transmission in Long Term Evolution (LTE) system as an example, a transmission from a UE to an RN adopts SL radio technology, and a transmission from an RN to a base station (eNB) adopts LTE radio technology. The RN is used for data forwarding between a UE and an eNB, which can be called Internet Protocol (IP) layer forwarding or layer 3 (L3) relaying.

Application scenarios of future wireless communication systems are becoming increasingly diversified, and different application scenarios have different performance demands on systems. To meet these various performance requirements, 3rd Generation Partner Project (3GPP) Radio Access Network (RAN) #72 Plenary decided to study New Radio (NR), or what is called the Fifth Generation (5G), and later at 3GPP RAN #75 Plenary, a Work Item (WI) was approved to standardize NR. Targeting at rapidly developing Vehicle-to-Everything (V2X) traffic, 3GPP also started SL standardization formulation and research work under NR framework. At 3GPP RAN #86 plenary, it was decided to start Study Item (SI) standardization work for NR SL Relay.

SUMMARY

Inventors found through researches that in Layer 2 relay communication architecture, a Service Data Adaptation Protocol (SDAP)/Packet Data Convergence Protocol (PDCP) packet, Radio Resource Control (RRC) information and a higher-layer packet can be forwarded through a relay node; while a protocol stack of Radio Link Control (RLC), Media Access Control (MAC) and Physical (PHY) terminates at two nodes that are in direct communications, such as a source node and a relay node, or a relay node and a base station. Therefore, control information of the PHY layer, the MAC sublayer or the RLC sublayer of a source node cannot be forwarded to a base station through a relay node.

In view of the above problem, the present disclosure discloses a method for transmitting control information of the PHY layer, the MAC sublayer or the RLC sublayer via a Uu interface in relay wireless communications, and when a remote node forwards data through a relay node, the remote node does not need to maintain uplink synchronization with a base station; when the remote node needs to transmit data via the Uu interface, the remote node acquires specific random access resources, utilizes a contention-free random access procedure to acquire uplink synchronization, and then performs uplink transmission to achieve the beneficial effects of effectively transmitting end-to-end control information of the PHY layer, the MAC sublayer or the RLC sublayer via the Uu interface in relay wireless communications. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict. Further, although the present disclosure is originally targeted at UE and base station scenarios, it is also applicable to relay and terminal scenarios, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:
- transmitting a first radio signal, the first radio signal comprising a first message;
- receiving a second radio signal, the second radio signal comprising a second message, the second message being used to indicate the first radio resource; and
- transmitting a third radio signal on a first radio resource;
- herein, the first message is used to trigger the second message, and the first radio resource is used for a contention-free random access.

In one embodiment, the present disclosure is applicable to a scenario where a first node is located in cell coverage.

In one embodiment, the present disclosure is applicable to layer 2 (L2) relay communication architecture.

In one embodiment, a problem to be solved in the present disclosure is: in the L2 relay communication architecture, control information of PHY layer, MAC sublayer or RLC sublayer of the first node cannot be forwarded to a second node through a relay node; and when the first node forwards data through the relay node, the first node and the second node do not need to maintain uplink synchronization, and cannot support transmitting uplink information via a Uu interface.

In one embodiment, solutions of the present disclosure include: when the first node needs to transmit uplink data via a Uu interface, the first node acquires specific random access resources through request, and acquires uplink synchronization by utilizing contention-free random access procedure, and then performs uplink transmission.

In one embodiment, a beneficial effect of the present disclosure includes: through the solution in the present disclosure, end-to-end control information of the PHY layer, MAC sublayer or RLC sublayer can be effectively transmitted via a Uu interface in L2 relay radio communication architecture.

According to one aspect of the present disclosure, comprising:
the third radio signal is triggered by the second message.

According to one aspect of the present disclosure, comprising:

the third radio signal being triggered by a third message;
herein, the third message comprises at least one of a physical-layer message or a higher-layer message.

According to one aspect of the present disclosure, comprising:

receiving a fourth radio signal, the fourth radio signal comprising a fourth message;
herein, the third radio signal is used to trigger the fourth message; and the fourth message is used for an uplink synchronization.

According to one aspect of the present disclosure, comprising:

transmitting a fifth radio signal, the fifth radio signal comprising the third message;
herein, a transmission of the fifth radio signal is later than a reception of the fourth radio signal.

According to one aspect of the present disclosure, comprising:

the second message comprising a first identifier;
herein, the first identifier uniquely identifies the first node at a serving base station of the first node.

According to one aspect of the present disclosure, comprising:

a receiver of the first radio signal being not co-located with the serving base station of the first node.

The present disclosure provides a method in a second node for wireless communications, comprising:

receiving a first message;
transmitting a second message, the second message being used to indicate the first radio resource; and
receiving a third radio signal on a first radio resource;
herein, the first message is used to trigger the second message, and the first radio resource is used for a contention-free random access.

According to one aspect of the present disclosure, comprising:

the third radio signal being triggered by the second message.

According to one aspect of the present disclosure, comprising:

the third radio signal being triggered by a third message;
herein, the third message comprises at least one of a physical-layer message or a higher-layer message.

According to one aspect of the present disclosure, comprising:

transmitting a fourth radio signal, the fourth radio signal comprising a fourth message;
herein, the third radio signal is used to trigger the fourth message; and the fourth message is used for an uplink synchronization.

According to one aspect of the present disclosure, comprising:

receiving a fifth radio signal, the fifth radio signal comprising the third message;
herein, a reception of the fifth radio signal is later than a transmission of the fourth radio signal.

According to one aspect of the present disclosure, comprising:

the second message comprising a first identifier;
herein, the first identifier uniquely identifies the first node at the second node.

The present disclosure provides a first node for wireless communications, comprising:

a first transmitter, transmitting a first radio signal, the first radio signal comprising a first message; transmitting a third radio signal on a first radio resource; and
a first receiver, receiving a second radio signal, the second radio signal comprising a second message, the second message being used to indicate the first radio resource;
herein, the first message is used to trigger the second message, and the first radio resource is used for a contention-free random access.

The present disclosure provides a second node for wireless communications, comprising:

a second receiver, receiving a first message; receiving a third radio signal on a first radio resource; and
a second transmitter, transmitting a second message, the second message being used to indicate the first radio resource;
herein, the first message is used to trigger the second message, and the first radio resource is used for a contention-free random access.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a structure block diagram of a processing device in a first node according to one embodiment of the present disclosure;

FIG. 9 illustrates a structure block diagram of a processing device in second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
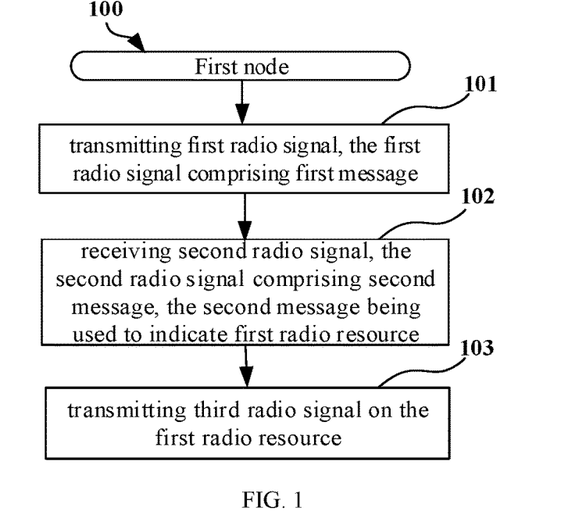
FIG. 1 illustrates a flowchart of transmission of a first node according to one embodiment of the present disclosure.

Embodiment 1 illustrates a flowchart of transmission of a first node according to one embodiment of the present disclosure, as shown in FIG. 1.

In embodiment 1, a first node 100 transmits a first radio signal in step 101, and the first radio signal comprises a first message; receives a second radio signal in step 102, the second radio signal comprises a second message, the second message is used to indicate a first radio resource; and transmits a third radio signal on the first radio resource in step 103; herein, the first message is used to trigger the second message, and the first radio resource is used for a contention-free random access.

In one embodiment, the first radio signal is transmitted via an air interface.

In one embodiment, the first radio signal is transmitted via a radio interface.

In one embodiment, all or partial bits comprised in the first message are used to generate the first radio signal.

In one embodiment, all or partial bits comprised in the first message and a reference signal are used together to generate the first radio signal.

In one embodiment, all or partial bits comprised in the first message acquires the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, and Modulation and Upconversion.

In one embodiment, the first radio signal comprises the first message.

In one embodiment, the first message comprises control information.

In one embodiment, the first message comprises a higher-layer signaling.

In one embodiment, the first message comprises an RRC signaling.

In one embodiment, the first message comprises an RRC signaling, and name of the first message comprises UL-Sync.

In one embodiment, the first message comprises an RRC signaling, and name of the first message comprises UL-SyncRequest.

In one embodiment, the first message comprises an RRC signaling, and name of the first message comprises rach-ConfigRequest.

In one embodiment, the first message is transmitted through a Signaling Radio Bearer (SRB).

In one embodiment, the first message is transmitted through an SRB1.

In one embodiment, the first message is transmitted through an SRB2.

In one embodiment, the first message comprises a MAC Control Element (CE).

In one embodiment, the first message comprises a MAC CE, and a value of a Logical Channel Identity (LCID) of the first message is a positive integer ranging from 35 to 44 including 35 and 44.

In one embodiment, the second radio signal is transmitted via an air interface.

In one embodiment, the second radio signal is transmitted via a radio interface.

In one embodiment, the second radio signal comprises the second message.

In one embodiment, the second message comprises a higher layer signaling.

In one embodiment, the second message comprises an RRC signaling.

In one embodiment, the second message comprises an RRC signaling, and name of the second message comprises rach.

In one embodiment, the second message comprises an RRC signaling, and name of the second message comprises rach-config.

In one embodiment, the second message comprises an RRC signaling, and name of the second message comprises rach-ConfigDedicated.

In one embodiment, the second message is transmitted through an SRB.

In one embodiment, the second message is transmitted through an SRB1.

In one embodiment, the second message is transmitted through an SRB2.

In one embodiment, the first message is used to trigger allocation of the first radio resource.

In one embodiment, the first message is used to trigger the second message comprising configuration information of the first radio resource.

In one embodiment, the second node receives the first message, as a response to receiving the first message, the second message is generated.

In one embodiment, a receiver of the first message is a transmitter of the second message.

In one embodiment, the second message is used to a first radio resource.

In one embodiment, the second message comprises configuration information of the first radio resource.

In one embodiment, the first radio resource is the first node-specific.

In one embodiment, the first radio resource may be used to uniquely identify a transmitter transmitting a signal through the first radio resource.

In one embodiment, the first radio resource comprises at least one of time-domain resources, frequency-domain resources, code-domain resources, or spatial-domain resources.

In one embodiment, the spatial-domain resources comprise a beam.

In one embodiment, the code-domain resources comprise a preamble sequence.

In one embodiment, the first radio resource is reserved for an uplink transmission.

In one embodiment, the first radio resource comprises a periodic radio resource set.

In one embodiment, the first radio resource is used for a contention-free random access.

In one embodiment, a contention-free random access procedure is performed after an RRC connection is established between the first node and a serving base station of the first node; the serving base station of the first node knows the purpose of the contention-free random access, therefore, it is a common general knowledge in the art that the serving base station of the first node configures radio resources used for the contention-free random access for the first node without the request of the first node.

In one embodiment, a request from the first node to configure radio resources for the contention-free random access for the first node violates the common general knowledge in the art.

In one embodiment, the first node forwards data to the second node through a relay node, and the first node and the second node are not uplink synchronized; when the first node needs to transmit data through an uplink, the first node requests the second node to configure radio resources used for the contention-free random access, and acquires an uplink synchronization through a contention-free random access procedure; under the scenario, the second node cannot know in advance the purpose of the first node triggering the contention-free random access.

In one embodiment, the first node needs to switch to forwarding data to the second node through a relay node after directly communicating with the second node via a Uu air interface for a period of time; the first node and the second node can no longer maintain uplink synchronization after switching to relay transmission; but if the first node decides to maintain the ability of directly communicating with the second node in relay transmission, the first node can request the second node to configure radio resources used for the contention-free random access, and acquire uplink synchronization through a contention-free random access procedure; in this scenario, the second node cannot know in advance the purpose of the first node triggering the contention-free random access.

In one embodiment, the third radio signal is transmitted via an air interface.

In one embodiment, the third radio signal is transmitted via a radio interface.

In one embodiment, the third radio signal is transmitted via a Uu interface.

In one embodiment, time-frequency resources occupied by the third radio signal are reserved for uplink transmission.

In one embodiment, the third radio signal is transmitted on the first radio resource.

In one embodiment, the third radio signal is transmitted through a Physical Random Access CHannel (PRACH).

In one embodiment, the third radio signal comprises a preamble.

In one embodiment, the third radio signal comprises a first message in a contention-free random access procedure.

In one embodiment, the third radio signal is transmitted through a PRACH and a PUSCH.

In one embodiment, the third radio signal comprises a preamble and MsgA.

In one embodiment, the third radio signal is transmitted on a radio resource in the periodic radio resource set comprised in the first radio resource.

Embodiment 2

Figure 2:
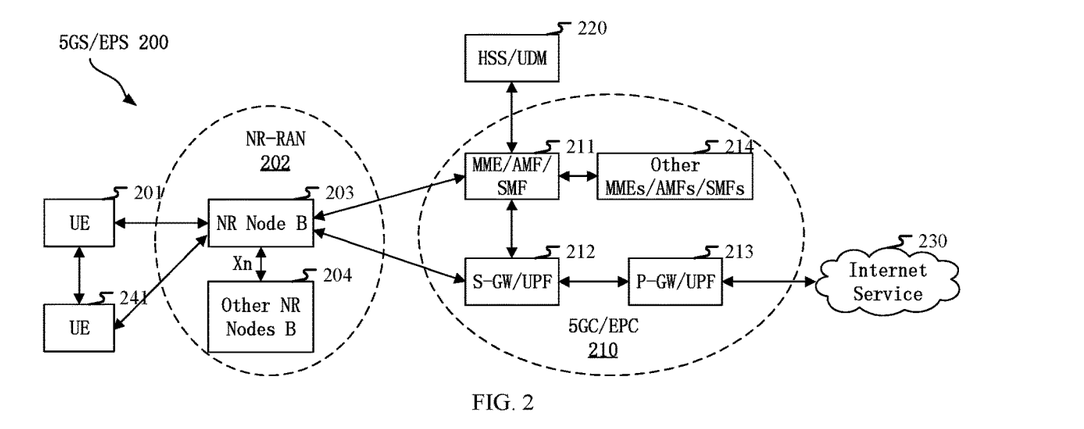
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). XnAP protocol of Xn interface is used to transmit control plane messages of wireless networks, and user plane protocol of Xn interface is used to transmit user plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 241 corresponds to a first node in the present disclosure, the UE 201 corresponds to a relay node in the present disclosure, and the NR node B 203 corresponds to a second node in the present disclosure.

In one embodiment, the UE 201 corresponds to a first node in the present disclosure, the UE 241 corresponds to a relay node in the present disclosure, and the NR node B 203 corresponds to a second node in the present disclosure.

In one embodiment, the UE 201 and the UE 241 respectively support SL communications.

In one embodiment, the UE 201 and the UE 241 respectively support a PC5 interface.

In one embodiment, the UE 201 and the UE 241 respectively support Internet of Vehicles (IoV).

In one embodiment, the UE 201 and the UE 241 respectively support V2X traffic.

In one embodiment, the UE 201 and the UE 241 respectively support D2D traffic.

In one embodiment, the UE 201 and the UE 241 respectively support public safety traffic.

In one embodiment, the UE 201 and the UE 241 respectively support relay transmission.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform device.

In one embodiment, the gNB 203 is satellite equipment.

In one embodiment, the gNB 203 is a base station that supports large delay differences.

In one embodiment, the gNB 203 is a test device (e.g., a transceiver device simulating partial functions of a base station, a signaling tester).

In one embodiment, the gNB 203 supports relay transmission.

In one embodiment, a radio link from the UE 201 to the gNB 203 is an uplink, and the uplink is used for executing an uplink transmission.

In one embodiment, a radio link from the gNB 203 to the UE 201 is a downlink, and the downlink is used for executing a downlink transmission.

In one embodiment, a radio link from the UE 241 to the gNB 203 is an uplink, and the uplink is used for executing an uplink transmission.

In one embodiment, a radio link from the gNB 203 to the UE 241 is a downlink, and the downlink is used for executing a downlink transmission.

In one embodiment, a radio link between the UE 201 and the UE 241 is a sidelink, and the sidelink is used for executing a sidelink transmission.

In one embodiment, the UE 201 and the gNB 203 are connected via a Uu interface.

In one embodiment, the UE 241 and the gNB 203 are connected via a Uu interface.

In one embodiment, the UE 201 and the UE 241 are connected via a PC5 interface.

Embodiment 3

Figure 3:
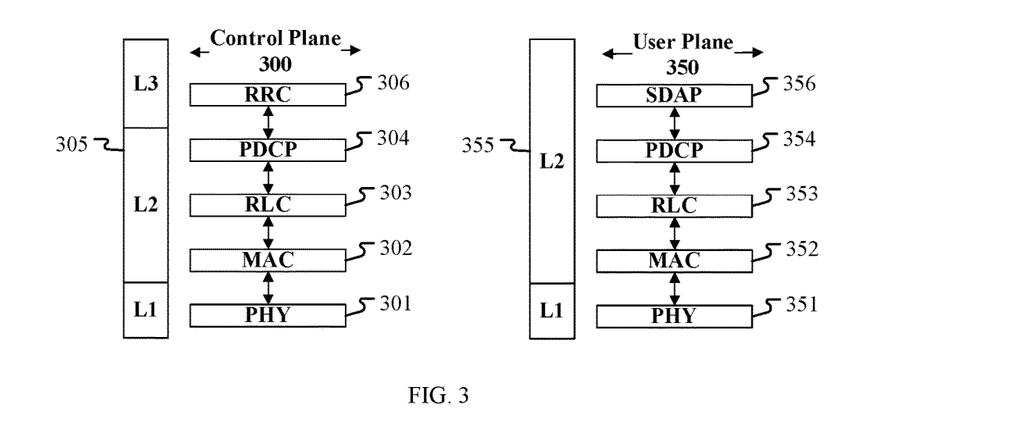
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel ID. The MAC sublayer 302 is also responsible for allocating between UEs various radio resources (i.e., resources block) in a cell. The MAC sublayer 302 is also responsible for Hybrid Automatic Repeat Request (HARM) operation. The Radio Resource Control (RRC) layer 306 in layer 3 (L3) of the control plane 300 is responsible for acquiring radio resources (i.e., radio bearer) and configuring the lower layer with an RRC signaling between the gNB and the UE. Although not shown, the RRC layer 306 in the control plane 300 of the UE may also have a V2X layer, and the V2X layer is responsible for generating a PC5 QoS parameter group and QoS rules according to received service data or service requests, a PC5 QoS flow is generated corresponding to a PC5 QoS parameter group, and a PC5 QoS flow ID and the corresponding PC5 QoS parameter group are transmitted to an Access Stratum (AS) Layer for QoS processing of a packet belonging to the PC5 QoS flow ID by the AS layer; the V2X layer also comprises a PC5-Signaling Protocol sublayer, and the V2X layer is responsible for indicating whether each transmission of the AS layer is a PC5-S transmission or a V2X service data transmission. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first message in the present disclosure is used to generate the MAC sublayer 302 and the MAC sublayer 352.

In one embodiment, the first message in the present disclosure is generated by the RRC layer 306.

In one embodiment, the second message in the present disclosure is generated by the RRC layer 306.

In one embodiment, the third message in the present disclosure is generated by the PHY layer 301 and the PHY layer 351.

In one embodiment, the third message in the present disclosure is used to generate the MAC sublayer 302 and the MAC sublayer 352.

In one embodiment, the third message in the present disclosure is used to generate the RRC sublayer 303 or the RLC sublayer 353.

In one embodiment, the fourth message in the present disclosure is used to generate the MAC sublayer 302 and the MAC sublayer 352.

In one embodiment, the first radio signal in the present disclosure is generated by the PHY layer 301 or the PHY layer 351.

In one embodiment, the second radio signal in the present disclosure is generated by the PHY layer 301 or the PHY layer 351.

In one embodiment, the third radio signal in the present disclosure is generated by the PHY layer 301 or the PHY layer 351.

In one embodiment, the fourth radio signal in the present disclosure is generated by the PHY layer 301 or the PHY layer 351.

In one embodiment, the fifth radio signal in the present disclosure is generated by the PHY layer 301 or the PHY layer 351.

In one embodiment, the L2 layer 305 or 355 belongs to a higher layer.

In one embodiment, the RRC layer 306 in the L3 layer belongs to a higher layer.

Embodiment 4

Figure 4:
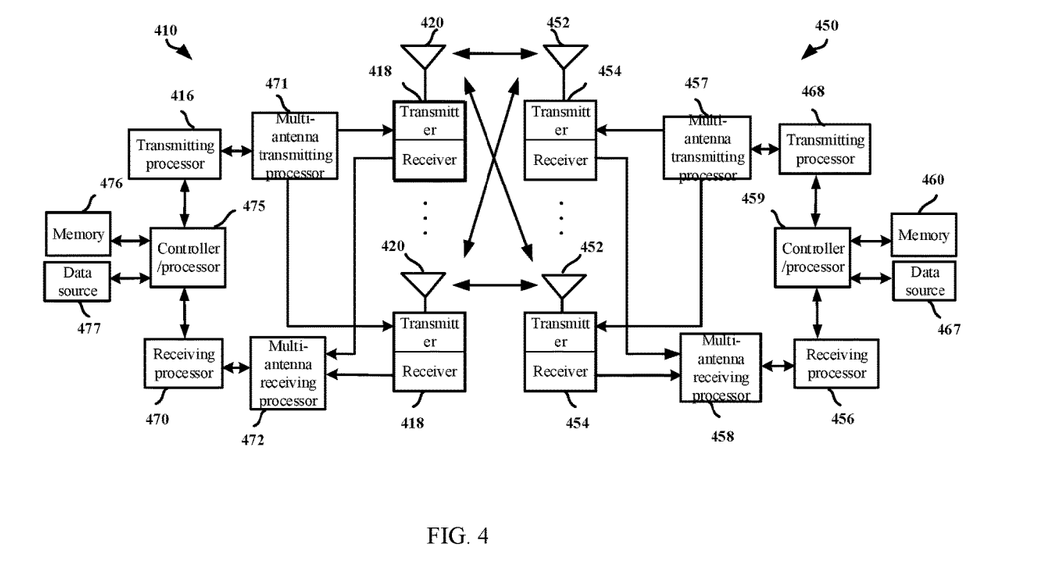
FIG. 4 illustrates a schematic diagram of hardware modules of a communication device according to one embodiment of the present disclosure.

Embodiment 4 illustrates a schematic diagram of hardware modules of a communication device according to one embodiment of the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network or a higher layer packet from the data source 477 is provided to the controller/processor 475. The core network and the data source 477 represents all protocol layers above the L2 layer. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to recover a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the first communication device 450. The higher layer packet from the controller/processor 475 can be provided to all protocol layers above the core network or the L2 layer, and various control signals can also be provided to the core network or L3 layer for L3 layer processing.

In one embodiment, the first communication device 450 comprises at least one processor and at least one memory. The at least one memory comprises computer program codes; the at least one memory and the computer program codes are configured to be used in collaboration with the at least one processor, the first communication device 450 at least transmits a first radio signal, the first radio signal comprises a first message; transmits a third radio signal on a first radio resource; and receives a second radio signal, the second radio signal comprises a second message, the second message is used to indicate the first radio resource; herein, the first message is used to trigger the second message, and the first radio resource is used for a non-competitive random access.

In one embodiment, the first communication device 450 comprises a memory that stores a computer readable instruction program. The computer readable instruction program generates an action when executed by at least one processor. The action includes: transmitting a first radio signal, the first radio signal comprising a first message; transmitting a third radio signal on a first radio resource; and receiving a second radio signal, the second radio signal comprising a second message, the second message being used to indicate the first radio resource; herein, the first message is used to trigger the second message, and the first radio resource is used for a non-competitive random access.

In one embodiment, the first communication device 450 comprises at least one processor and at least one memory. The at least one memory comprises computer program codes; the at least one memory and the computer program codes are configured to be used in collaboration with the at least one processor, the first communication device 450 at least transmits a first radio signal, the first radio signal comprises a first message; transmits a third radio signal on a first radio resource; and receives a second radio signal, the second radio signal comprises a second message, the second message is used to indicate the first radio resource; herein, the first message is used to trigger the second message, and the first radio resource is used for a contention-free random access.

In one embodiment, the first communication device 450 comprises a memory that stores a computer readable instruction program. The computer readable instruction program generates an action when executed by at least one processor. The action includes: transmitting a first radio signal, the first radio signal comprising a first message; transmitting a third radio signal on a first radio resource; and receiving a second radio signal, the second radio signal comprising a second message, the second message being used to indicate the first radio resource; herein, the first message is used to trigger the second message, and the first radio resource is used for a contention-free random access.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first message; and receives a third radio signal on a first radio resource; and transmits a second message, the second message is used to indicate the first radio resource; herein, the first message is used to trigger the second message, and the first radio resource is used for a contention-free random access.

In one embodiment, the second communication device 410 comprises a memory that stores a computer readable instruction program. The computer readable instruction program generates an action when executed by at least one processor. The action includes: receiving a first message; and receiving a third radio signal on a first radio resource; and transmitting a second message, the second message being used to indicate the first radio resource; herein, the first message is used to trigger the second message, and the first radio resource is used for a contention-free random access.

In one embodiment, the first communication device 450 corresponds to a first node in the present disclosure, and the second communication device 410 corresponds to a second node in the present disclosure.

In one embodiment, the first communication device 450 corresponds to a first node in the present disclosure, and the second communication device 410 corresponds to a relay node in the present disclosure.

In one embodiment, the first communication device 450 corresponds to a relay node in the present disclosure, and the second communication device 410 corresponds to a second node in the present disclosure.

In one embodiment, the first communication device 450 is a relay node.

In one embodiment, the first communication device 450 is a UE.

In one embodiment, the second communication device 410 is a base station.

In one embodiment, the second communication device 410 is a UE.

In one embodiment, the second communication device 410 is a relay node.

In one embodiment, at least one of the antenna 452, the transmitter 454, the multi-antenna transmitting processor 457, the transmitting processor 468 or the controller/processor 459 is used to transmit a first radio signal in the present disclosure.

In one embodiment, at least one of the antenna 420, the receiver 418, the multi-antenna receiving processor 472, the receiving processor 470 or the controller/processor 475 is used to receive a first radio signal in the present disclosure.

In one embodiment, at least one of the antenna 452, the transmitter 454, the multi-antenna transmitting processor 457, the transmitting processor 468 or the controller/processor 459 is used to transmit a third radio signal in the present disclosure.

In one embodiment, at least one of the antenna 420, the receiver 418, the multi-antenna receiving processor 472, the receiving processor 470 or the controller/processor 475 is used to receive a third radio signal in the present disclosure.

In one embodiment, at least one of the antenna 420, the transmitter 418, the multi-antenna transmitting processor 471, the transmitting processor 416 or the controller/processor 475 is used to transmit a second radio signal in the present disclosure.

In one embodiment, at least one of the antenna 452, the receiver 454, the multi-antenna receiving processor 458, the receiving processor 456 or the controller/processor 459 is used to receive a second radio signal in the present disclosure.

In one embodiment, at least one of the antenna 420, the transmitter 418, the multi-antenna transmitting processor 471, the transmitting processor 416 or the controller/processor 475 is used to transmit a fourth radio signal in the present disclosure.

In one embodiment, at least one of the antenna 452, the receiver 454, the multi-antenna receiving processor 458, the receiving processor 456 or the controller/processor 459 is used to receive a fourth radio signal in the present disclosure.

In one embodiment, at least one of the antenna 452, the transmitter 454, the multi-antenna transmitting processor 457, the transmitting processor 468 or the controller/processor 459 is used to transmit a fifth radio signal in the present disclosure.

In one embodiment, at least one of the antenna 420, the receiver 418, the multi-antenna receiving processor 472, the receiving processor 470 or the controller/processor 475 is used to receive a fifth radio signal in the present disclosure.

Embodiment 5

Figure 5:
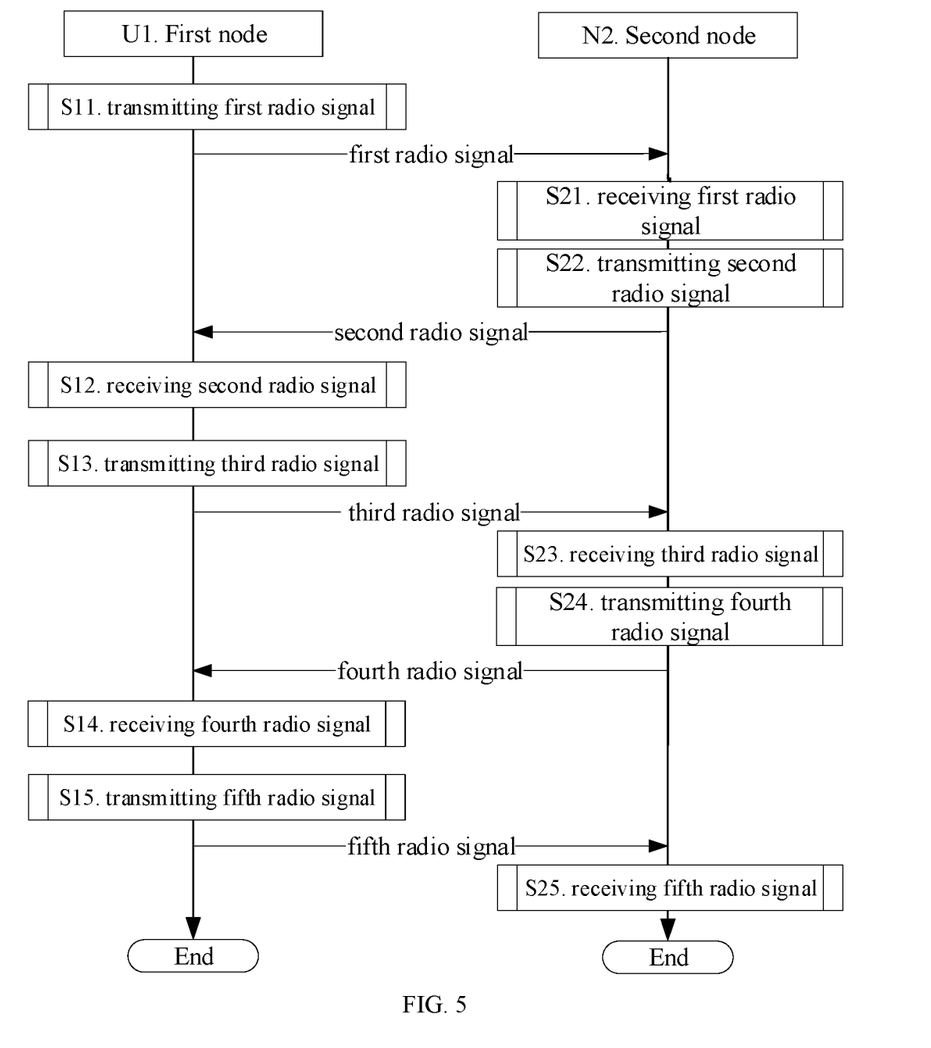
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node N2 are in communications via a Uu air interface. It is particularly underlined that the order illustrated in the embodiment does not put constraints over sequences of signal transmissions and implementations.

The first node U1 transmits a first radio signal in step S11; receives a second radio signal in step S12; transmits a third radio signal in step S13; receives a fourth radio signal in step S14; and transmits a fifth radio signal in step S15.

The second node N2 receives a first radio signal in step S21; transmits a second radio signal in step S22; receives a third radio signal in step S23; transmits a fourth radio signal in step S24; and receives a fifth radio signal in step S25.

In one embodiment, the first node transmits the first radio signal via a Uu interface.

In one embodiment, the second node transmits the second radio signal via a Uu interface.

In one embodiment, the first radio signal is transmitted via a Uu interface.

In one embodiment, time-frequency resources occupied by the first radio signal are reserved for an uplink transmission.

In one embodiment, the first radio signal is transmitted through a Physical Uplink Shared Channel (PUSCH).

In one embodiment, the second radio signal is transmitted via a Uu interface.

In one embodiment, time-frequency resources occupied by the second radio signal are reserved for a downlink transmission.

In one embodiment, the second radio signal is transmitted through a Physical Downlink Shared Channel (PDSCH).

In one embodiment, after receiving the second radio signal, the first node is switched to communicating with the second node through a relay node.

In one embodiment, the second message comprises a first identifier.

In one embodiment, the first identifier uniquely identifies the first node at a serving base station of the first node.

In one embodiment, the first identifier is a Cell Radio Network Temporary Identifier (C-RNTI).

In one embodiment, the first identity is a random number.

In one embodiment, the first identity comprises 16 bits.

In one embodiment, the first identity is allocated by the serving base station of the first node.

In one embodiment, the first identity is used to identify the first node at PHY.

In one embodiment, the first identity is used to scramble a PHY transmitted for the first node.

In one subembodiment of the above embodiment, the PHY comprises at least one of a Physical Downlink Control CHannel (PDCCH), a Physical Uplink Control CHannel (PUCCH), a PUSCH, or a PDSCH.

In one embodiment, the third radio signal is triggered by the second message.

In one embodiment, the first node receives the second message, as a response to receiving the second message, the first node transmits the third radio signal.

In one embodiment, the third radio signal is triggered by the third message.

In one embodiment, the first node generates a third message, as a response to generating the third message, the first node transmits the third radio signal.

In one embodiment, the third message comprises at least one of a physical-layer message or a higher-layer message; the higher-layer message comprises at least one of a MAC sublayer message or an RLC sublayer message.

In one embodiment, the third message comprises at least one of a PHY message, a MAC sublayer message or an RLC sublayer message.

In one embodiment, the third message comprises a Buffer Status Report (BSR).

In one embodiment, the third message comprises a Beam Failure Recovery (BFR).

In one embodiment, the third message comprises a Listen Before Talk (LBT) failure.

In one embodiment, the third message comprises a Power Headroom Report (PHR).

In one embodiment, the third message comprises a Scheduling Request (SR).

In one embodiment, the third message comprises a UL sync request.

In one embodiment, the third message comprises an RLC control message.

In one embodiment, the third message comprises an RLC Status report.

In one embodiment, the fourth radio signal is transmitted via an air interface.

In one embodiment, the fourth radio signal is transmitted via a radio interface.

In one embodiment, the fourth radio signal is transmitted via a Uu interface.

In one embodiment, time-frequency resources occupied by the fourth radio signal are reserved for a downlink transmission.

In one embodiment, the fourth radio signal is transmitted through a PDSCH.

In one embodiment, the fourth radio signal comprises a second message in a contention-free random access procedure.

In one embodiment, the fourth radio signal comprises the fourth message.

In one embodiment, the third radio signal is used to trigger the fourth message.

In one embodiment, the second node receives a third radio signal, as a response to receiving the third radio signal, the second node transmits the fourth radio signal, and the fourth radio signal comprises the fourth message.

In one embodiment, the fourth message comprises a Random Access Response (RAR).

In one embodiment, the fourth message comprises a Timing Advance (TA) value.

In one embodiment, the TA value field comprises 12 bits.

In one embodiment, the TA value is a positive integer ranging from 0 and 3846 including 0 and 3846.

In one embodiment, the fourth message comprises a UL grant.

In one embodiment, the fourth message comprises a C-RNTI.

In one embodiment, the C-RNTI comprised in the fourth message uniquely identifies the first node in the serving base station of the first node.

In one embodiment, the TA value comprised in the fourth message is used for a UL synchronization.

In one embodiment, $N_{TA}=T_A \cdot 16 \cdot 64/2^\mu$, where $N_{TA}$ is a first offset value; $\mu$ indicates an SCS, for example, $\mu=0$ indicates that an SCS is 15 KHz, $\mu=1$ indicates that an SCS is 30 KHz, which can refer to 3GPP TS 38.211 for details; and $T_A$ is the TA value comprised in the fourth message.

In one embodiment, $T_{TA}=(N_{TA}\ N_{TA,offset})T_c$, where $T_{TA}$ is a second offset, $N_{TA}$ is the first offset; $N_{TA,offset}$ can refer to 3GPP TS 38.133; and $T_c=1/(\Delta f_{max}\cdot N_f)$, where $\Delta f_{max}=480000$ Hz, and $N_f=4096$.

In one embodiment, the first node acquires a start time of a downlink frame through receiving a downlink synchronization signal.

In one embodiment, the phrase of the fourth message being used for a UL synchronization includes: a start time of an uplink frame of the first node is a start time the downlink frame after through the second offset.

In one embodiment, the phrase of the fourth message being used for a UL synchronization includes: a start time of an uplink frame of the first node is the second offset earlier than a start time of the downlink frame.

In one embodiment, the first node transmits a fifth radio signal.

In one embodiment, the fifth radio signal is transmitted via an air interface.

In one embodiment, the fifth radio signal is transmitted via a radio interface.

In one embodiment, the fifth radio signal is transmitted via a Uu interface.

In one embodiment, time-frequency resources occupied by the fifth radio signal are reserved for an uplink transmission.

In one embodiment, the fifth radio signal is transmitted through a PUSCH.

In one embodiment, time-frequency resources occupied by the fifth radio signal are indicated by the UL grant comprised in the fourth message.

In one embodiment, the fifth radio signal comprises the third message.

In one embodiment, the third message and the fourth message are respectively transmitted via a Uu interface.

In one embodiment, a transmission of the fifth radio signal is not earlier than a reception of the fourth radio signal.

In one embodiment, the first node receives the fourth radio signal, and the first node performs uplink transmission after acquiring a UL synchronization according to the received TA value.

In one embodiment, the third radio only comprises a preamble, the first node receives the fourth radio signal, and transmits the third message after acquiring a UL synchronization according to the received TA value.

In one embodiment, the first node is located within a first cell, and a serving base station of the first cell is the second node.

Embodiment 6

Figure 6:
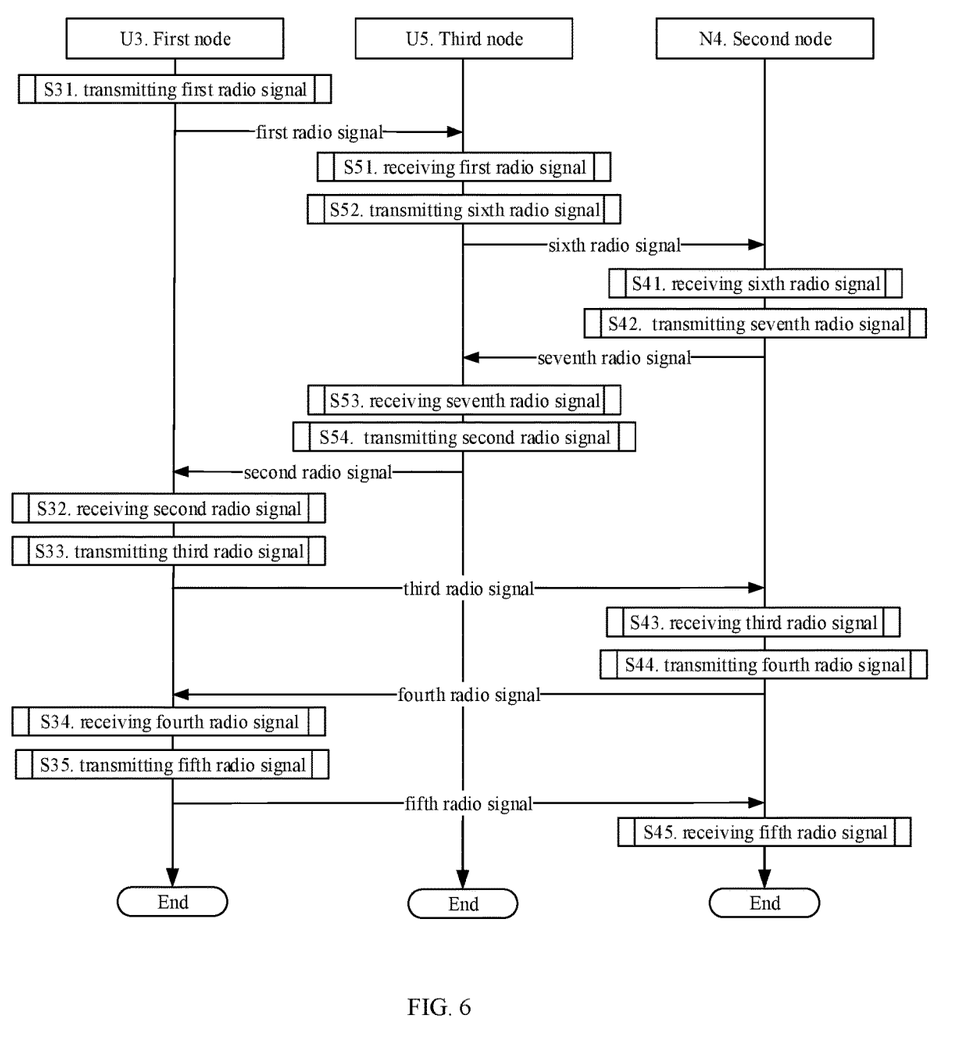
FIG. 6 illustrates another flowchart of radio signal transmission according to one embodiment of the present disclosure.

Embodiment 6 illustrates another flowchart of radio signal transmission according to one embodiment in the present disclosure, as shown in FIG. 6. In FIG. 6, a first node U3 is in communications with a third node U5 via a PC5 air interface, a third node U5 is in communications with a second node N4 via a Uu air interface, and a first node U3 is in communications with a second node N4 via a Uu air interface. It is particularly underlined that the order illustrated in the embodiment does not put constraints over sequences of signal transmissions and implementations.

The first node U3 transmits a first radio signal in step S31; receives a second radio signal in step S32; transmits a third radio signal in step S33; receives a fourth radio signal in step S34; and transmits a fifth radio signal in step S35.

The second node N4 receives a sixth radio signal in step S41; transmits a seventh radio signal in step S42; receives a third radio signal in step S43; transmits a fourth radio signal in step S44; and receives a fifth radio signal in step S45.

The third node U5 receives a first radio signal in step S51; transmits a sixth radio signal in step S52; receives a seventh radio signal in step S53; and transmits a second radio signal in step S54.

In one embodiment, the first radio signal is transmitted via a PC5 interface.

In one embodiment, time-frequency resources occupied by the first radio signal are reserved for sidelink transmission.

In one embodiment, the first radio signal is transmitted through a Physical Sidelink Shared Channel (PSSCH).

In one embodiment, the second radio signal is transmitted via a PC5 interface.

In one embodiment, time-frequency resources occupied by the second radio signal are reserved for sidelink transmission.

In one embodiment, the second radio signal is transmitted through a PSSCH.

In one embodiment, the first node forwards the first message through the third node.

In one embodiment, the third node receives the first radio signal, recovers the first message out of the first radio signal, and the first message is used to generate the sixth radio signal.

In one embodiment, the second node forwards the second message through the third node.

In one embodiment, the third node receives the seventh radio signal, recovers the second message out of the seventh radio signal, and the second message is used to generate the second radio signal.

In one embodiment, the third node is a relay node.

In one embodiment, the first node and the second node forwards the first message and the second message through the relay node.

In one embodiment, a receiver of the first radio signal being not co-located with the serving base station of the first node.

In one embodiment, a receiver of the first radio is a node other than the second node.

Embodiment 7

Figure 7:
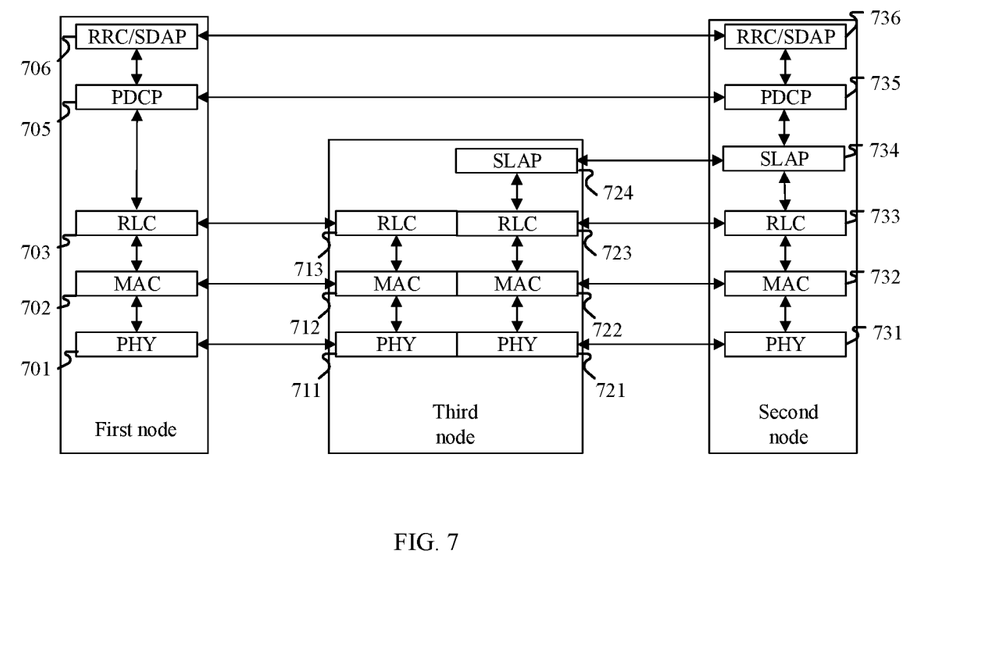
FIG. 7 illustrates a schematic diagram of a radio protocol architecture of relay transmission according to one embodiment of the present disclosure.

Embodiment 7 illustrates a schematic diagram of a radio protocol architecture of relay transmission according to one embodiment of the present disclosure, as shown in FIG. 7.

In FIG. 7, in relay transmission, taking data transmitted by a first node to a second node through a third node as an example (data transmitted by a second node to a first node through a third node in the same way): a first target data is sequentially processed by the PDCP sublayer 705 and the RLC sublayer 703 at a first node side to generate a first target MAC PDU, then is transmitted to the PHY layer 701, then is transmitted to the PHY layer 711 of a third node via an air interface, and recovers a first RLC data through the processing of the MAC sublayer 712 and the RLC sublayer 713; a second RLC data is regenerated at the RLC sublayer 723 after the first RLC data is processed by the SideLink Adaptation Protocol (SLAP) sublayer 724, and generates a second target MAC PDU through the processing of the MAC sublayer 722 and then is passed to the PHY layer 721; and then is transmitted to the PHY layer 731 of the third node via an air interface, and recovers a second target MAC PDU through the MAC sublayer 732, and then recovers a first target data after sequentially through the RLC sublayer 733, the SLAP sublayer 734 and the PDCP sublayer 735.

In one embodiment, the first node maintains an RLC entity 703, a MAC entity 702 and a PHY entity 701; the third node maintains an RLC entity 713, a MAC entity 712, a PHY entity 711, an RLC entity 723, a MAC entity 722 and a PHY entity 721; and the second node maintains an RLC entity 733, a MAC entity 732 and a PHY entity 731.

In one embodiment, the RLC entity 713 maintained by the third node corresponds to the RLC entity 703 maintained by the first node.

In one embodiment, the RLC entity 723 maintained by the third node corresponds to the RLC entity 733 maintained by the second node.

In one embodiment, the MAC entity 712 maintained by the third node corresponds to the MAC entity 702 maintained by the first node.

In one embodiment, the MAC entity 722 maintained by the third node corresponds to the MAC entity 732 maintained by the second node.

In one embodiment, the PHY entity 711 maintained by the third node corresponds to the PHY entity 701 maintained by the first node.

In one embodiment, the PHY entity 721 maintained by the third node corresponds to the PHY entity 731 maintained by the second node.

In one embodiment, the SLAP sublayer implements bearer mapping function, comprising mapping data transmitted by the RLC entity 713 to be transmitted by the RLC entity 723.

In one embodiment, the SLAP sublayer implements routing function, comprising forwarding data received from the first node to the second node.

In one embodiment, a data unit generates an SLAP PDU in the SLAP sublayer; the SLAP PDU comprises an SLAP header and an SLAP SDU indicated by the SLAP header; and the SLAP SDU is an RLC SDU.

In one embodiment, the SLAP header comprises a source transmitter identifier of an SLAP SDU indicated by the SLAP header.

In one embodiment, the SLAP header comprises a target receiver identifier of an SLAP SDU indicated by the SLAP header.

In one embodiment, the SLAP header comprises a radio bearer identifier to which an SLAP SDU indicated by the SLAP header belongs.

In one embodiment, the SLAP header comprises a sequence number of an SLAP SDU indicated by the SLAP header.

Embodiment 8

Embodiment 8 illustrates a structure block diagram of a processing device in a first node according to one embodiment of the present disclosure, as shown in FIG. 8. In FIG. 8, a processing device 800 of a first node comprises a first receiver 801 and a first transmitter 802. The first receiver 801 comprises at least one of the transmitter/receiver 454 (including the antenna 452), the receiving processor 456, the multi-antenna receiving processor 458 or the controller/processor 459 in FIG. 4 of the present disclosure; the first transmitter 802 comprises at least one of the transmitter/receiver 454 (including the antenna 452), the transmitting processor 468, the multi-antenna transmitting processor 457, or the controller/processor 459 in FIG. 4 of the present disclosure.

In embodiment 8, the first transmitter 802 transmits a first radio signal, the first radio signal comprises a first message; transmits a third radio signal on a first radio resource; and the first receiver 801 receives a second radio signal, the second radio signal comprises a second message, the second message is used to indicate the first radio resource; herein, the first message is used to trigger the second message, and the first radio resource is used for a contention-free random access.

In one embodiment, the third radio signal is triggered by the second message.

In one embodiment, the third radio signal is triggered by a third message; herein, the third message comprises at least one of a physical-layer message or a higher-layer message.

In one embodiment, the first receiver 801 receives a fourth radio signal, the fourth radio signal comprises a fourth message; herein, the third radio signal is used to trigger the fourth message; and the fourth message is used for an uplink synchronization.

In one embodiment, the first transmitter 802 transmits a fifth radio signal, the fifth radio signal comprising the third message; herein, a transmission of the fifth radio signal is later than a reception of the fourth radio signal.

In one embodiment, the second message comprises a first identifier; herein, the first identifier uniquely identifies the first node at a serving base station of the first node.

In one embodiment, a receiver of the first radio signal being not co-located with the serving base station of the first node.

Embodiment 9

Embodiment 9 illustrates a structure block diagram of a processing device in a second node according to one embodiment of the present disclosure, as shown in FIG. 9. In FIG. 9, a processing device 900 of a second node comprises a second receiver 901 and a second transmitter 902. The second receiver 901 comprises at least one of the transmitter/receiver 418 (including the antenna 420), the receiving processor 470, the multi-antenna receiving processor 472 or the controller/processor 475 in FIG. 4 of the present disclosure; the second transmitter 902 comprises at least one of the transmitter/receiver 418 (including the antenna 420), the transmitting processor 416, the multi-antenna transmitting processor 471 or the controller/processor 475 in FIG. 4 of the present disclosure.

In embodiment 9, the second receiver 901 receives a first message; receives a third radio signal on a first radio resource; and the second transmitter 902 transmits a second message, and the second message is used to indicate the first radio resource; herein, the first message is used to trigger the second message, and the first radio resource is used for a contention-free random access.

In one embodiment, the third radio signal is triggered by the second message.

In one embodiment, the third radio signal is triggered by a third message; herein, the third message comprises at least one of a physical-layer message or a higher-layer message.

In one embodiment, the second transmitter 902 transmits a fourth radio signal, the fourth radio signal comprises a fourth message; herein, the third radio signal is used to trigger the fourth message; and the fourth message is used for an uplink synchronization.

In one embodiment, the second receiver 901 receives a fifth radio signal, the fifth radio signal comprises the third message; herein, a reception of the fifth radio signal is later than a transmission of the fourth radio signal.

In one embodiment, the second message comprises a first identifier; herein, the first identifier uniquely identifies the first node at the second node.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transmitter, transmitting a first radio signal to a base station before transmitting a third radio signal, the first radio signal comprising a first message; generating a third message; as a response to generating the third message, transmitting the third radio signal to the base station on a first radio resource; and
a first receiver, receiving a second radio signal, the second radio signal comprising a second message, the second message being used to indicate the first radio resource; and after receiving the second radio signal, switching to communicate with the base station through a relay node;
wherein the first radio signal is transmitted through a Physical Uplink Shared Channel (PUSCH); the first message comprises a Medium Access Control (MAC) Control Element (CE), and a value of a Logical Channel Identity (LCID) of the first message is a positive integer ranging from 35 to 44; the first message is used to trigger the second message, and the first radio resource is used for a contention-free random access.

2. The first node according to claim 1, wherein the third radio signal is triggered by a third message;
wherein the third message comprises at least one of a physical-layer message or a higher-layer message; the value of the Logical Channel Identity of the first message is 43.

3. The first node according to claim 1, comprising:
the first receiver, receiving a fourth radio signal, the fourth radio signal comprising a fourth message;
wherein the third radio signal is used to trigger the fourth message; and the fourth message is used for an uplink synchronization.

4. The first node according to claim 3, comprising:
the first transmitter, transmitting a fifth radio signal, the fifth radio signal comprising the third message;

wherein a transmission of the fifth radio signal is later than a reception of the fourth radio signal.

5. The first node according to claim 1, wherein the second message comprises a first identifier;
wherein the first identifier uniquely identifies the first node at a serving base station of the first node.

6. The second node according to claim 5, wherein the third radio signal is triggered by a third message;
wherein the third message comprises at least one of a physical-layer message or a higher-layer message; the value of the Logical Channel Identity of the first message is 43.

7. A second node for wireless communications, comprising:
a second receiver, receiving a first radio signal from a UE before receiving a third radio signal, the first radio signal comprising a first message; receiving the third radio signal from the UE on a first radio resource; and
a second transmitter, transmitting a second message, the second message being used to indicate the first radio resource; and after transmitting the second message, switching to communicate with the UE through a relay node;
wherein a third message is generated; the third radio signal is transmitted as a response of the third message being generated; the first radio signal is received through a Physical Uplink Shared Channel (PUSCH); the first message comprises a MAC Control Element (CE), and a value of a Logical Channel Identity (LCID) of the first message is a positive integer ranging from 35 to 44; the first message is used to trigger the second message, and the first radio resource is used for a contention-free random access.

8. The second node according to claim 7, comprising:
the second transmitter, transmitting a fourth radio signal, the fourth radio signal comprising a fourth message;
wherein the third radio signal is used to trigger the fourth message; and the fourth message is used for an uplink synchronization.

9. The second node according to claim 8, comprising:
the second receiver, receiving a fifth radio signal, the fifth radio signal comprises the third message;
wherein a reception of the fifth radio signal is later than a transmission of the fourth radio signal.

10. The second node according to claim 7, wherein the second message comprises a first identifier;
wherein the first identifier uniquely identifies a transmitter of the third radio signal at the second node.

11. A method in a first node for wireless communications, comprising:
transmitting a first radio signal to a base station before transmitting a third radio signal, the first radio signal comprising a first message;
receiving a second radio signal, the second radio signal comprising a second message, the second message being used to indicate a first radio resource; and
after receiving the second radio signal, switching to communicate with the base station through a relay node; and
generating a third message;
as a response to generating the third message, transmitting the third radio signal to the base station on the first radio resource;
wherein the first radio signal is transmitted through a Physical Uplink Shared Channel (PUSCH); the first message comprises a MAC Control Element (CE), and a value of a Logical Channel Identity (LCID) of the first message is a positive integer ranging from 35 to 44; the first message is used to trigger the second message, and the first radio resource is used for a contention-free random access.

12. The method in a first node according to claim 11, wherein the third radio signal is triggered by a third message;
wherein the third message comprises at least one of a physical-layer message or a higher-layer message; the value of the Logical Channel Identity of the first message is 43.

13. The method in a first node according to claim 11, comprising:
receiving a fourth radio signal, the fourth radio signal comprising a fourth message;
wherein the third radio signal is used to trigger the fourth message; and the fourth message is used for an uplink synchronization.

14. The method in a first node according to claim 13, comprising:
transmitting a fifth radio signal, the fifth radio signal comprising the third message;
wherein a transmission of the fifth radio signal is later than a reception of the fourth radio signal.

15. The method in a first node according to claim 11, wherein the second message comprises a first identifier;
wherein the first identifier uniquely identifies the first node at a serving base station of the first node.

* * * * *